_United States Patent_ [19]

Seelig

[11] Patent Number: 4,618,447
[45] Date of Patent: Oct. 21, 1986

[54] SURFACTANT-BASED SOLVENT SYSTEM FOR DEWATERING DIFFERENT SUBSTRATES

[75] Inventor: Stanley S. Seelig, Williamsville, N.Y.

[73] Assignee: Allied Corporation, Morris Township, Morris County, N.J.

[21] Appl. No.: 791,147

[22] Filed: Oct. 29, 1985

Related U.S. Application Data

[63] Continuation-in-part of Ser. No. 674,394, Nov. 23, 1984, abandoned.

[51] Int. Cl.$^4$ ............................ C11D 1/34; C11D 1/62
[52] U.S. Cl. ........................................ 252/139; 252/153; 252/171; 252/174.16; 252/545; 252/547; 252/DIG. 17; 260/501.15; 260/501.21
[58] Field of Search ........... 252/153, 139, 171, 174.16, 252/528, 545, 547, DIG. 17, 106; 8/142; 260/501.15, 501.21

[56] References Cited

U.S. PATENT DOCUMENTS

| | | | |
|---|---|---|---|
| 4,182,687 | 1/1980 | Bartlett | 252/194 |
| 4,264,516 | 4/1981 | Hiestand | 260/404.5 A |
| 4,401,584 | 8/1983 | Tajkowski et al. | 252/194 |
| 4,438,026 | 3/1984 | Tajkowski | 252/545 |
| 4,461,652 | 7/1984 | Richmond | 134/2 |

FOREIGN PATENT DOCUMENTS

| | | |
|---|---|---|
| 0149480 | 7/1985 | European Pat. Off. . |
| 3319023 | 12/1983 | Fed. Rep. of Germany . |
| 72093 | 6/1981 | Japan . |
| 2122998 | 1/1984 | United Kingdom . |

OTHER PUBLICATIONS

Phosphate Surfactants—Properties and Uses, Soap and Chemical Specialties, pp. 55-58 and 93, Apr. 1962.

_Primary Examiner_—Paul Lieberman
_Assistant Examiner_—Hoa Van Le
_Attorney, Agent, or Firm_—Arthur J. Plantamura; Jay P. Friedenson

[57] ABSTRACT

This invention relates to improved drying compositions comprising a volatile halocarbon and one or more aromatic quaternary ammonium salts of a phosphate ester, and methods of using such compositions for cleaning and/or drying non-absorbent articles.

37 Claims, No Drawings

SURFACTANT-BASED SOLVENT SYSTEM FOR DEWATERING DIFFERENT SUBSTRATES

RELATED APPLICATION

This application is a continuation-in-part application of U.S. Ser. No. 674,394, filed Nov. 23, 1984 now abandoned.

BACKGROUND OF THE INVENTION

1. Field of the Invention

This invention relates to improved surfactant-solvent drying compositions. More particularly, this invention relates to such compositions which include a volatile solvent component and one or more surfactants that have the capability of removing water or aqueous films from the surfaces of a broad range of substrates.

2. Prior Art

Various volatile solvent drying compositions have been used in the past. Illustrative of such compositions are those described in U.S. Pat. Nos. 4,438,026 and 4,401,584 and German Pat. No. 3,319,023. These compositions remove water from the substrate to be dried by displacement. Drying in this manner avoids an energy consuming drying step and greatly expedites subsequent processing of the substrate component.

Prior art drying compositions suffer from a number of disadvantages which limit their usefulness. For example, some volatile solvent drying compositions used in the past have often proved less than satisfactory by failing to effectively displace water from the surface to be dried. Also, although some compositions in the past have proven effective to displace water from some substrates such as metal, e.g. stainless steel, aluminum and brass, they have not been practically effective on nonmetallic surfaces, such as glass or ceramic.

An additional and serious problem encountered with varying severity in the use of solvent drying solutions, depending on the specific application and substrate to be dried, is the fact that such solutions tend to emulsify or otherwise generate aggomerates and are difficult to purify or to be freed of aqueous impurities so that the drying solution can be reused. The presence of emulsions or other non-soluble formations in these drying compositions interferes with the free elimination of water, such as by decantation, and ultimately interrupts the water-displacement process which is the essential objective of the substrate drying treatment.

In some dewatering compositions, the tendency to form emulsions with water is controlled by the incorporation of suitable demulsifier additives. While such additives do prevent emulsification, they do not improve the effectiveness of the compositions for dewatering all substrates. Moreover, some of these surfactants have excessive water extractability which necessitates the addition of more surfactant to the composition on a periodic basis.

Therefore there is a need for a new improved surfactant/volatile solvent drying composition which obviates one or more of the disadvantages characterizing known drying compositions.

SUMMARY OF THE INVENTION

In accordance with this invention there is provided a novel surfactant-volatile solvent drying composition and a process for using such composition to dry a variety of substrates. More particularly, the composition of this invention comprises:

one or more volatile organic halocarbons and an "effective amount" of one or more quaternary ammonium salts of a phosphate acid ester, said salts of the formula:

wherein:

$A^+$ is a moiety of the formula:

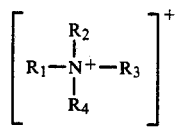

$B^-$ is a moiety of the formula:

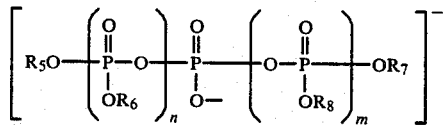

n and m are integers from 0 to about 10, provided that n+m is not greater than 10 and further provided that n+m is equal to or greater than 1, when $R_5$, $R_6$, $R_7$ and $R_8$ are other than aryl, aralkyl or alkylaryl;

$R_1$ is alkyl having from about 1 to about 2 carbon atoms;

$R_2$ is alkyl having from about 8 to about 18 carbon atoms;

$R_3$ is $R_1$ or $R_2$;

$R_4$ is $R_1$, $R_2$, aryl, aralkyl or alkaryl; and $R_5$, $R_6$, $R_7$ and $R_8$ are the same or different and are hydrogen, alkyl having from about 8 to about 18 carbon atoms, aryl, aralkyl or alkaryl;

with the proviso that at least one of $R_4$, $R_5$, $R_6$, $R_7$ and $R_8$ is aryl, aralkyl or alkaryl when n+m is 0, and with the further proviso that at least one of $R_5$, $R_6$, $R_7$ and $R_8$ is other than hydrogen.

The composition of this invention can be conveniently used in the process of this invention for cleaning and/or drying nonabsorbent articles. More particularly, the process of this invention comprises the steps of:

(a) contacting all or a portion of the surfaces of the article with the composition of this invention;

(b) removing the article from contact with said composition;

(c) contacting all or a portion of the surface of the article with the hot or cold solvent without surfactant present;

(d) removing the article from contact with said solvent;

(e) drying said article by effecting evaporation of said composition from the surface of said article.

Steps (c) and (d) are optional and will not affect the drying ability of the said composition; however, they will decrease the amount of surfactant remaining on the surface of said article.

The solvent drying composition of this invention is very effective in displacing water from a board range of substrates of different compositions. In particular, the drying composition of the invention serve to displace water from various common substrates, including metals, such as stainless steel, aluminum alloys, brass and the like; and from glass and ceramic surfaces, such as lime glasses, borosilicate glass, unglazed alumina, silica (as on silicon wafers used in miniaturized electronic circuits), fired alumina and the like. In addition, the drying compositions of the invention do not form noticeable emulsions with the displaced water or form very small amounts of such emulsion. This latter property is important for practical, efficient water removal by decantation when the drying solvent is used in commercial drying apparatus because, for example, it avoids clogging of equipment and process delays. Moreover the drying composition of this invention requires a minimum of attention or monitoring when being used in a drying machine for long periods of time, and infrequent additions of the surfactant component during use because of low surfactant solubility in water and resistance to chemical attack.

DESCRIPTION OF THE PREFERRED EMBODIMENTS

The composition of this invention includes two essential components. The first essential component is one or more "volatile halocarbons". As used herein, a "volatile halocarbon" is a halocarbon having a boiling point of at least about 20° C. at atmospheric pressure. Preferred volatile halocarbons are halocarbons having at least two carbon atoms, at least one fluoro substituent and at least one chloro substituent, and having a boiling point of at least 28° C. at atmospheric pressure, and particularly preferred volatile halocarbons are chloro and fluoro substituted ethanes. Amongst these particularly preferred volatile halocarbons, the halocarbon, FC-113 (1,1,2-trichloro-1,2,2-trifluoroethane) is most preferred.

The amount of volatile halocarbon included in the composition can vary widely. Any amounts known to those of skill in the art can be employed, as for example amounts employed in U.S. Pat. Nos. 4,438,026 and 4,401,584 and German Pat. No. 3,319,023.

The second essential component of the composition of this invention is one or more quaternary ammonium salts of ortho- and/or polyphosphate acid esters, herein referred to as "surfactants." It is an essential feature of this invention that the salts contain at least one aromatic substituent, in either the cationic quaternary ammonium moiety or the anionic ortho- and/or polyphosphate acid ester moiety. Because of the presence of the aromatic substituent or substituents, the salts do not form stable emulsions with water as do non-aromatic salt surfactants of the same general type or form small amounts of such emulsions, thus obviating the need for demulsifiers. Moreover, these materials are freely soluble in the volatile halocarbon forming substantially homogeneous compositions, and can displace water from a broad range of metallic, glass, ceramic and like substrates.

The composition comprises an "effective amount" of one or more aromatic quaternary ammonium salts. As used herein, "an effective amount" is an amount which is capable of improving the drying capability of the halocarbons to any extent. The amount of aromatic quaternary ammonium salt included in the composition of this invention can vary widely. Usually, the amount of such a surfactant is not greater than about 5 weight percent based on the total weight of the composition primarily to reduce the amount of surfactant remaining on the surface. However, while not practical, larger amounts can be used if after treatment with the composition the article being dried is thereafter treated with a volatile halocarbon having either no surfactant or small amounts. In the preferred embodiments of the invention, the amount of surfactant is from about 2 to about 0.0001 weight percent based on the total weight of the composition, and in the particularly preferred embodiments it is from about 1 to about 0.001 weight percent on the aforementioned basis. Among these particularly preferred embodiments, most preferred are those in which the weight percent of surfactant is from about 0.1 to about 0.01 weight percent by weight of the composition.

The quaternary ammonium salts which are useful in the practice of this invention are of the formula:

$$[A^+]\cdot[B^-]$$

wherein:

$A^+$ is a moiety of the formula:

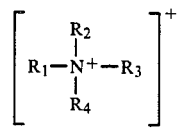

$B^-$ is a moiety of the formula:

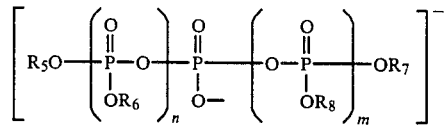

n and m are integers from 0 to about 10, provided that n+m is not greater than 10, and further provided that n+m is equal to or greater than 1 when $R_5$, $R_6$, $R_7$ and $R_8$ are other than aryl, aralkyl or alkylaryl;

$R_1$ is alkyl having from about 1 to about 2 carbon atoms;

$R_2$ is alkyl having from about 8 to about 18 carbon atoms;

$R_3$ is $R_1$ or $R_2$;

$R_4$ is $R_1$, $R_2$, aryl, aralkyl or alkaryl; and $R_5$, $R_6$, $R_7$ and $R_8$ are the same or different and are hydrogen, alkyl having from about 8 to about 18 carbon atoms, aryl, aralkyl or alkaryl, with the proviso that at least one of $R_4$, $R_5$, $R_6$, $R_7$ and $R_8$ are aryl, aralkyl or alkaryl, and with the further proviso that at least one of $R_5$, $R_6$, $R_7$ and $R_8$ is other than hydrogen.

Aromatic quaternary ammonium salts and aliphatic quaternary ammonium salts which are useful in the conduct of this invention can be obtained from commercial sources or prepared in accordance with standard procedures. For example, such surfactants can be prepared by reacting an appropriate ortho- and/or polyphosphate acid ester, such as octylphenyl hydrogen phosphate, with a suitable amine, as for example triethylamine, to prepare the corresponding amine salt of an orthophosphate ester such as triethylamine octylphenyl phosphate. The amine salt of an orthophosphate ester is then reacted with a quaternary ammonium halide such as n-alkyl dimethyl benzyl ammonium chloride to provide the desired aromatic surfactant such as the n-alkyl dimethyl benzyl ammonium salt of octylphenyl hydrogen phosphate.

The following compounds are illustrative of aromatic quaternary ammonium salts which can be used in the practice of this invention.

n-Alkyl dimethyl benzyl ammonium salt of octylphenyl hydrogen phosphate;

n-Alkyl dimethyl benzyl ammonium salt of bis(2-ethylhexyl) hydrogen pyrophosphate;

n-Alkyl dimethyl benzyl ammonium salt of bis(n-octylphenyl) hydrogen pyrophosphate n-Alkyl dimethyl benzyl ammonium salt of bis(t-butylphenyl) hydrogen pyrophosphate;

Myristyl dimethyl benzyl ammonium salt of bis(2-ethylhexyl) hydrogen pyrophosphate;

Stearyl dimethyl benzyl ammonium salt of bis(2-ethylhexyl) hydrogen pyrophosphate; and n-Alkyl dimethyl naphthyl ammonium salt of bis(2-ethylhexyl) hydrogen pyrophosphate.

Preferred for use in the practice of this invention are aromatic quaternary ammonium salts of a phosphate acid ester of the formula:

$$[A^+] \cdot [B^-]$$

wherein:

$A^+$ is a moiety of the formula:

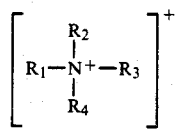

$B^-$ is a moiety of the formula:

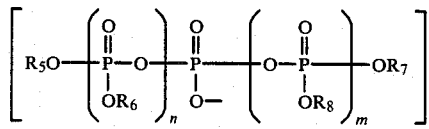

n and m are integers from 0 to 10 provided that n+m is not greater than 10;

$R_1$ is alkyl having from about 1 to about 2 carbon atoms;

$R_2$ is alkyl having from about 8 to about 18 carbon atoms;

$R_3$ is $R_1$ or $R_2$;

$R_4$ is $R_1$, $R_2$, aryl, aralkyl or alkaryl and $R_5$, $R_6$, $R_7$ and $R_8$ are the same or different at each occurrence and are hydrogen alkyl having from about 8 to about 18 carbon atoms, aryl, aralkyl or alkylaryl; with the proviso that at least one of $R_4$, $R_5$, $R_6$, $R_7$ and $R_8$ are aryl, aralkyl or alkaryl, and with the further proviso that at least one of $R_5$, $R_6$, $R_7$ and $R_8$ is other than hydrogen.

Preferred for use in the practice of this invention amongst the above aromatic quaternary ammonium salts are those in which n and m are integers from 0 to about 5, provided that n+m is not greater than 5;

$R_1$ is methyl or ethyl;

$R_2$ is alkyl having from about 12 to about 16 carbon atoms;

$R_3$ is methyl or ethyl;

$R_4$ is aryl, aralkyl or alkaryl; and $R_5$, $R_6$, $R_7$ and $R_8$ are the same or different and are hydrogen, alkyl having from about 8 to about 18 carbon atoms or alkaryl, with the proviso that at least one of $R_5$, $R_6$, $R_7$ and $R_8$ is other than hydrogen.

Particularly preferred for use in the practice of this invention are such surfactants in which n and m are integers from 0 to about 1, provided that n+m is not greater than 2;

$R_1$ is methyl;

$R_2$ is a mixture of $C_{12}$, $C_{14}$ and $C_{16}$ alkyl groups;

$R_3$ is methyl;

$R_4$ is benzyl or naphthyl; and $R_5$, $R_6$, $R_7$ and $R_8$ are the same or different and are hydrogen, alkyl having about 8 carbon atoms or alkaryl with the proviso that at least one of $R_5$, $R_6$, $R_7$ and $R_8$ is other than hydrogen.

Amongst these particularly preferred embodiments, most preferred are those embodiments in which the composition contains a mixture of surfactants in which:

n and m are 0;

$R_1$ is methyl;

$R_2$ is $C_{12}$, $C_{14}$ or $C_{16}$ alkyl;

$R_3$ is methyl;

$R_4$ is benzyl; and $R_5$ and $R_6$ are the same or different and are hydrogen or octyl phenyl with the proviso that at least one of $R_5$ and $R_6$ is other than hydrogen.

Also, among the particularly preferred embodiments most preferred are those in which the composition contains a mixture of surfactants in which:

n and m are 0, 1 or 2, provided that n+m is not greater than 3;

$R_1$ is methyl;

$R_2$ is a $C_{12}$, $C_{14}$ or $C_{16}$ alkyl groups;

$R_3$ is $R_1$;

$R_4$ is benzyl; and $R_5$, $R_6$, $R_7$ and $R_8$ are the same or different and are alkyl having 8 carbon atoms or hydrogen with the proviso that at least one of $R_5$, $R_6$, $R_7$ and $R_8$ is other than hydrogen.

Especially useful aromatic surfactants for use in the practice of this invention are the n-alkyl dimethyl benzyl ammonium salts of bis-(2-ethylhexyl) hydrogen pyrophosphate and octylphenyl hydrogen phosphate.

The composition of this invention can be to clean and/or dry nonabsorbent articles constructed of such materials as metals, glasses, ceramics and the like. In the method of this invention, the article is first contacted with the composition of this invention in solution form. Method of contacting is not critical and can vary widely. For example, the article can be immersed in a container of the composition, or the article can be sprayed with the composition using conventional equipment. Complete immersion of the article is preferred because it generally insures contact between the composition and all exposed surfaces of the article. However, any other method which can easily provide such complete contact can be used.

The contacting time can vary widely. Usually, the contacting time is at least about 10 minutes. In the preferred embodiments of the invention, the contacting time is from about 1 to about 5 minutes, and in the particularly preferred embodiments is from about 1 to about 4 minutes. Amongst these preferred embodiments most preferred are those embodiments in which the contacting time is from about 1 to about 3 minutes.

Contacting temperatures also can vary widely depending on the boiling point of the halocarbon component of the composition. In general, the contacting temperature is equal to or less than such boiling point.

After the contacting step, the article is removed from contact with the composition and removal of compositions adhering to exposed surfaces of the article is affected by evaporation, by conventional means. Optionally, the remaining minimal amounts of surfactant adhering to exposed surfaces of the article can be further removed by contacting the article with surfactant-free solvent that is hot or cold. Finally, holding the article in the solvent vapor will further decrease the presence of surfactant residues remaining on the article. Again, removal of solvent adhering to exposed surfaces of the article is effected by evaporation.

In general evaporation of the composition is effected in less than about 30 seconds, and preferably less than about 10 seconds. Neither temperature nor pressure is critical. Atmospheric or subatmospheric pressures can be employed; and temperatures above and below the boiling point of the halocarbon component can be used.

The composition and process of this invention are preferably carried out using conventional drying machines and systems. Illustrative of such drying machines are those described in U.S. Pat. No. 3,386,181.

The following specific example is presented to illustrate the invention in detail.

EXAMPLE I

To evaluate the performance of various compositions in terms of their ability to displace water from wet substrates and to give good separations between water and solvent phases, the following test methods were used.

"DRYING TEST"

The "Drying Test" measures the efficiency of water-displacement performance and is conducted as follows:

(1) A stainless-steel beaker, of about 2-liter capacity, is fitted with a cooling-coil of several turns of tubing that conforms closely to the inner surface of the upper part of the beaker. The coil is connected to a source of cooling fluid. This arrangement is referred to as a "boiling sump".

(2) The boiling sump is charged with 500 ml of the solution to be tested and is placed upon a thermostatted hot plate. The solution is heated to a rolling boil and vapors are refluxed off the surface of the cooling coil.

(3) Specimens, i.e., "coupons" having an approximate size 18 mm × 76 mm (about 0.71 inches by 3 inches), of the substrates to be tested are pre-cleaned to a condition of no-water-break cleanliness (a terminology used by those who work in the field of surface-finishing of metals and other substrates to refer to a surface condition essentially free of oil film). The coupons are attached to suspension means and are wetted with water just prior to the test. The wetted coupon is completely immersed for a pre-determined time in the boiling test solution, e.g., five seconds. It is then raised into the vapor region above the liquid and held there for 30 seconds. The coupon is then removed and examined for the presence of water on the surface. If it is dry, the process is repeated with fresh, wet coupons for confirmation and a dry time of less than five seconds is reported. If the coupon is wet at five seconds, then longer immersion times are used, successively, until complete water-displacement, i.e., a dry surface, is observed. The "drying time" is reported as the immersion times (in seconds) to achieve "dry" surface conditions upon removal from the boiling sump. The shorter the time for drying, the better the water-displacement efficiency.

"PHASE-SEPARATION TEST"

The phase-separation test simulates the agitation imparted to a liquid by a centrifugal circulating pump such as may be found on a vapor-phase degreasing machine. This test also measures the relative rates of separation for aqueous and solvent phases after the end of the agitation period. The more rapid and complete the separation of the phases, the more potentially useful is the solvent-surfactant composition in a drying machine. The "Phase Separation Test" is conducted as follows:

(1) The test is run in a Wiring Blender (Waring Products Co.), Model 1088. The test is done at "low" speed and the built-in timer is set for a five-second running time. A one-pint blender jar with a tightfitting screw cap is used for agitation. Separation rate measurements are made in eight-ounce, tall, straight-sided wide-mouth glass jars that have screw caps.

(2) The test is conducted with a 180 ml portion of the solvent solution in the jar of the blender. To this portion is added 18 ml (10 vol %) of distilled water. The jar is closed tightly and the blender is run at "low" speed for five seconds. The dispersion is immediately poured over into a measurement jar and the initial time is noted. Total volume height in the jar is measured along the outside of the jar with a ruler or divider. Further readings of the depths of each phase are taken at 5, 10, 20, 30 and 60 minutes after transfer. For each reading, the depth of each clear phase is measured.

(3) These depths are then calculated as volume percents of the original total volume, or as proportions of the original phase volumes. The volume proportions may then be plotted against elapsed time for each phase and curves are obtained that show relative separation dynamics for the various mixtures. Alternatively, separation percentages for the phases at 30 and/or 60 minutes may be used for quickly comparing relative performances of the mixtures being tested.

(4) In each case, any formation of a stable emulsion in a phase or at the interface is noted. The depth of such an emulsion is subtracted from the depth of corresponding clear phase for purposes of calculating the percent separation of that phase.

"LIFE TEST"

The "Life Test" measures the ability of a given mixture to resist emulsification in the presence of accumulated water in the boiling sump or in the phase-separation chamber. This test is outlined below:

(1) A boiling sump, as described for the "Drying Test" above, is used. The vessel is charged with 500 ml of the solvent-surfactant mixture to be evaluated and 50 ml (10 vol %) of distilled water are added (2) The solvent-water mixture is refluxed for 30 minutes, and then allowed to separate for 15 minutes in a separatory funnel. The solvent phase is then drawn off and checked for drying performance.

(3) Four additional 500 mo portions (100 vol %) of distilled water are added and the procedure of paragraph 2 is repeated after each addition.

(4) To pass this test, the solvent must dry substrates at substantially the same drying time as in the "Drying Test" above.

The compositions evaluated in the tests all contained FC 113 and the surfactants listed in the following Table I.

TABLE I

| Composition | Weight % | SURFACTANT n-alkyl dimethyl benzyl ammonium salt of: |
|---|---|---|
| 1 | 0.10 | dimethyl hydrogen pyrophosphate |
| 2 | 0.10 | dibutyl hydrogen pyrophosphate |
| 3 | 0.10 | bis(2-ethylhexyl)hydrogen pyrophosphate |
| 4 | 0.10 | a polyphosphate acid ester |
| 5 | 0.05 | a polyphosphate acid ester |
| 6 | 0.025 | a polyphosphate acid ester |
| 7 | 0.05 | bis(2-ethylhexyl)hydrogen pyrophosphate |
| 8 | 0.05 | octylphenyl hydrogen phosphate |

The above-referenced surfactant compositions were prepared using "Hyamine 3500 ®" (n-alkyl dimethyl benzyl ammonium chloride manufactured and sold by Lonza, Inc.) where the alkyl has the following composition: 50% $C_{14}$, $C_{12}$ and 10% $C_{16}$. Compositions 1, 7 and 8 were prepared from phosphates obtained from Stauffer Chemical Co. Compositions 2 and 3 were prepared from phosphates obtained from Mobil Chemical Co. The remaining phosphates were prepared from "Strodex M0-100 ®", a polyphosphate acid ester manufactured and sold by Dexter Chemical Co.

The above-described compositions were evaluated in the Drying Test, Phase Separation Test and Life Test described above, the results of which are set forth in the following Table II. In Table II, the following abbreviations are defined as follows:
(a) "P" means passed
(b) "F" means failed
(c) "NT" means not determined

TABLE II

| TEST | 1 | 2 | 3 | 4 | 5 | 6 | 7 | 8 |
|---|---|---|---|---|---|---|---|---|
| I. DRYING TEST | | | | | | | | |
| (a) Stainless Steel | F | P | P | P | P | P | P | P |
| (b) Brass | NT | NT | NT | NT | NT | NT | P | P |
| (c) Aluminum | NT | NT | NT | NT | NT | NT | P | P |
| (d) Lime Glass | F | P | P | P | P | P | P | P |
| (e) PYREX Glass | NT | NT | NT | NT | NT | NT | P | P |
| (f) $Al_2O_3$ Wafer | F | P | P | P | P | P | P | P |
| (g) Unglazed Spark Plug Body | NT | NT | NT | NT | NT | NT | P | P |
| II. PHASE SEPARATION TEST | P | F | P | P | P | P | P | P |
| III. LIFE TEST | | | | | | | | |
| (a) Stainless Steel | NT | F | P | P | P | P | P | P |
| (b) Brass | NT | NT | NT | NT | NT | NT | P | P |
| (c) Aluminum | NT | NT | NT | NT | NT | NT | P | P |
| (d) Lime Glass | NT | F | P | P | P | P | P | P |
| (e) PYREX Glass | NT | NT | NT | NT | NT | NT | P | P |
| (f) $Al_2O_3$ Wafer | NT | F | P | P | P | F | P | P |
| (g) Unglazed Spark Plug Body | NT | NT | NT | NT | NT | NT | P | P |

EXAMPLE II

The effectiveness of the composition of this invention was compared to that of commercial drying solvents at various pH values using the Phase Separation Test, Drying Test and Life Test procedures described above. The commercial drying solvent selected for testing was "Freon TDFC ®" an FC-113 based drying solvent manufactured and sold by DuPont Co. The results of these tests are set forth in the following Tables III and IV.

TABLE III

EVALUATIONS UNDER ACIDIC CONDITIONS (pH = 2.5)

| TEST | COMPOSITION TESTED AND RESULTS | | |
|---|---|---|---|
| | FREON TDFC | 7 | 8 |
| I. DRYING TEST | | | |
| (a) Stainless Steel | P | P | P |
| (b) Lime Glass | P | P | P |
| (c) $Al_2O_3$ Wafer | P | P | P |
| II. PHASE SEPARATION TEST | E | P | P |
| III. LIFE TEST | | | |
| (a) Stainless Steel | F | P | F |
| (b) Lime Glass | F | P | F |
| (c) $Al_2O_3$ Wafer | F | P | F |

E — Emulsion

TABLE IV

EVALUATIONS UNDER ACIDIC CONDITIONS (pH = 11.5)

| TEST | COMPOSITION TESTED AND RESULTS | | |
|---|---|---|---|
| | Freon TDFC | 7 | 8 |
| I. DRYING TEST | | | |
| (a) Stainless Steel | NT | P | P |
| (b) Lime Glass | NT | P | P |
| (c) $Al_2O_3$ Wafer | NT | P | P |
| II. PHASE SEPARATION TEST | E | P | P |
| III. LIFE TEST | | | |
| (a) Stainless Steel | NT | P | P |
| (b) Lime Glass | NT | P | P |
| (c) $Al_2O_3$ | NT | P | P |

What is claimed is:

1. A quaternary ammonium salt of a phosphate acid ester of the formula:

$$[A^+]\cdot[B^-]$$

wherein:

$A^+$ is a moiety of the formula:

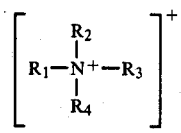

$B^-$ is a moiety of the formula:

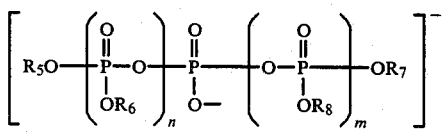

n and m are integers from 0 to about 10 provided that n+m is not greater than 10 and further provided that n+m is equal to or greater than 1 when $R_5$, $R_6$, $R_7$ and $R_8$ are other than aryl, aralkyl or alkylaryl;

$R_1$ is alkyl having from about 1 to about 2 carbon atoms;

$R_2$ is alkyl having from about 8 to about 18 carbon atoms;

$R_3$ is $R_1$ or $R_2$;

$R_4$ is $R_1$, $R_2$, aryl, aralkyl or alkaryl and $R_5$, $R_6$, $R_7$ and $R_8$ are the same or different at each occurrence and are hydrogen alkyl having from about 8 to about 18 carbon atoms, aryl, aralkyl or alkylaryl; with the proviso that at least one of $R_4$, $R_5$, $R_6$, $R_7$ and $R_8$ are aryl, aralkyl or alkaryl when $n+m$ is 0, and with the further proviso that at least one of $R_5$, $R_6$, $R_7$ and $R_8$ other than hydrogen.

2. A quaternary ammonium salt of a phosphate acid ester according to claim 1 wherein in salt is an aromatic salt of the formula:

wherein:

$A^+$ is a moiety of the formula:

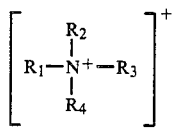

$B^-$ is a moiety of the formula:

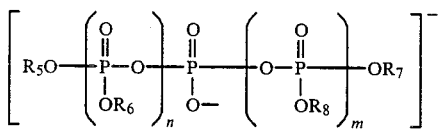

n and m are integers from 0 to about 10 provided that $n+m$ is not greater than 10;

$R_1$ is alkyl having from about 1 to about 2 carbon atoms;

$R_2$ is alkyl having from about 8 to about 18 carbon atoms;

$R_3$ is $R_1$ or $R_2$;

$R_4$ is $R_1$, $R_2$, aryl, aralkyl or alkaryl and $R_5$, $R_6$, $R_7$ and $R_8$ are the same or different at each occurrence and are hydrogen alkyl having from about 8 to about 18 carbon atoms, aryl, aralkyl or alkylaryl; with the proviso that at least one of $R_4$, $R_5$, $R_6$, $R_7$ and $R_8$ is aryl, aralkyl or alkaryl, and with the further proviso that at least one of $R_5$, $R_6$, $R_7$ and $R_8$ is other than hydrogen.

3. A salt according to claim 2 wherein:

n amd m are integers from about 0 to about 5, provided that $n+m$ is not greater than 5;

$R_1$ and $R_3$ are the same or different and are methyl or ethyl;

$R_2$ is alkyl having from about 12 to about 16 carbon atoms;

$R_4$ is aryl, aralkyl or alkylaryl; and $R_5$, $R_6$, $R_7$ and $R_8$ are the same or different and are hydrogen, alkyl having from about 8 to about 18 carbon atoms or alkaryl, with the proviso that at least one of $R_5$, $R_6$, $R_7$ and $R_8$ is other than hydrogen.

4. A salt according to claim 2 wherein $R_5$ is hydrogen; and $R_6$, $R_7$ and $R_8$ are the same and are alkyl having from about 8 to about 18 carbon at alkaryl.

5. A salt according to claim 2 wherein n and m are integers from 0 to 1, provided that $n+m$ is not greater than 2.

6. A salt according to claim 5 wherein n and m are 0.

7. A salt according to claim 2 wherein $R_1$ and $R_3$ are methyl.

8. A salt according to claim 29 wherein $R_4$ is benzyl or naphthyl.

9. A salt according to claim 2 wherein $R_6$, $R_7$ and $R_8$ are the same and are alkyl having about 8 carbons or alkaryl.

10. A salt according to claim 2 wherein $R_5$, $R_7$ and $R_8$ are the same or different and are hydrogen or octylphenyl; and $R_6$ is $R_7$.

11. A solvent-surfactant drying composition which comprises:

one or more volatile halocarbons and an effective amount of one or more aromatic quaternary ammonium salts of a phosphate acid ester of the formula:

wherein:

$A^+$ is a moiety of the formula:

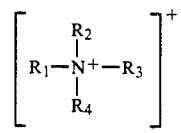

$B^-$ is a moiety of the formula:

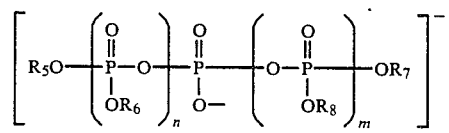

n and m are integers from 0 to about 10 provided that $n+m$ is not greater than 10, and further provided that $n+m$ is equal to or greater than 1 when $R_5$, $R_6$, $R_7$ and $R_8$ are other than aryl, aralkyl or alkylaryl;

$R_1$ is alkyl having from about 1 to about 2 carbon atoms;

$R_2$ is alkyl having from about 8 to about 18 carbon atoms;

$R_3$ is $R_1$ or $R_2$;

$R_4$ is $R_1$, $R_2$, aryl, aralkyl or alkaryl; and $R_5$, $R_6$, $R_7$ and $R_8$ are the same or different at each occurrence and are hydrogen, alkyl having from about 8 to about 18 carbon atoms, aryl, aralkyl or alkylaryl; with the proviso that at least one of $R_4$, $R_5$, $R_6$, $R_7$ and $R_8$ is aryl, aralkyl or alkaryl when $n+m$ is 0, and with the further proviso that at least one of $R_5$, $R_6$, $R_7$ and $R_8$ is other than hydrogen.

12. A solvent-surfactant drying composition according to claim 11 which comprises an effective amount of one or more aromatic quaternary ammonium salts of a phosphate acid ester of the formula:

wherein:

$A^+$ is a moiety of the formula:

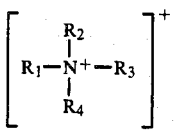

$B^-$ is a moiety of the formula:

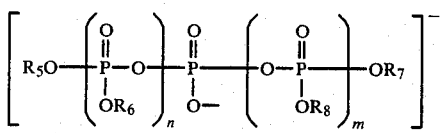

n and m are integers from 0 to about 10, provided that n+m is not greater than 10;
$R_1$ is alkyl having from about 1 to about 2 carbon atoms;
$R_2$ is alkyl having from about 8 to about 18 carbon atoms;
$R_3$ is $R_1$ or $R_2$;
$R_4$ is $R_1$, $R_2$, aryl aralkyl or alkaryl; and
$R_5$, $R_6$, $R_7$ and $R_8$ are the same or different at each occurrence and are hydrogen, alkyl having from about 8 to about 18 carbon atoms, aryl, aralkyl or alkylaryl; with the proviso that at least one of $R_4$, $R_5$, $R_6$, $R_7$ and $R_8$ are aryl, aralkyl or alkaryl, and with the further proviso that at least one of $R_5$, $R_6$, $R_7$ and $R_8$ is other than hydrogen.

13. A composition according to claim 12 wherein said volatile halocarbons are selected from the group consisting of halocarbons having at least one fluoro-substituent and at least one chloro-substituent.

14. A composition according to claim 13 comprising a single halocarbon 1,1,2-trichloro-1,2,2-trifluoroethane.

15. A composition according to claim 12 wherein:
n and m are integers from about 0 to about 5, provided that m+n is not greater than 5;
$R_1$ and $R_3$ are the same or different and are methyl or ethyl;
$R_2$ is alkyl having from about 12 to about 16 carbon atoms;
$R_4$ is aryl, aralkyl or alkylaryl; and
$R_5$, $R_6$, $R_7$ and $R_8$ are the same or different and are hydrogen, alkyl having from about 8 to about 18 carbon atoms or alkaryl, with the proviso that at least one of $R_5$, $R_6$, $R_7$ and $R_8$ is other than hydrogen.

16. A composition according to claim 15 wherein:
$R_5$ is hydrogen; and
$R_6$, $R_7$ and $R_8$ are the same and are alkyl having from about 8 to about 18 carbon atoms or alkaryl.

17. A composition according to claim 12 wherein n and m are integers from 0 to about 1, provided that n+m is greater than 2.

18. A composition according to claim 17 wherein n and m are 0.

19. A composition according to claim 12 wherein $R_1$ and $R_3$ are methyl.

20. A composition according to claim 12 wherein $R_4$ is benzyl or naphthyl.

21. A composition according to claim 12 wherein:
$R_6$, $R_7$ and $R_8$ are the same and are alkyl having about 8 carbons or alkaryl.

22. A composition according to claim 12 wherein:
$R_5$ and $R_7$ are the same or different and are hydrogen or octylphenyl; and
$R_6$ and $R_8$ are $R_7$.

23. A composition according to claim 12 wherein said composition comprises a mixture of quaternary ammonium salts in which $R_2$ is a mixture of alkyls having 12, 14 and 16 carbon atoms.

24. A composition according to claim 12 which contains a mixture of quaternary ammonium salts in which:
n and m are integers from 0 to about 1, provided that n+m is not greater than 2;
$R_1$ is methyl;
$R_2$ is $C_{12}$, $C_{14}$, or $C_{16}$ alkyl;
$R_3$ is $R_1$;
$R_4$ is benzyl or naphthyl;
$R_5$ is hydrogen; and
$R_6$, $R_7$ and $R_8$ are the same and are alkyl having about 8 carbon atoms or alkaryl.

25. A composition according to claim 12 which contains a mixture of quaternary ammonium salts in which:
n and m are integers from 0 to about 1, provided than n+m is not greater than 2;
$R_1$ is methyl;
$R_2$ is $C_{12}$, $C_{14}$, or $C_{16}$ aklyl;
$R_3$ is $R_1$;
$R_4$ is benzyl;
$R_5$ and $R_7$ are the same or different and are hydrogen or octylphenyl; and
$R_6$ and $R_8$ are $R_7$.

26. A composition according to claim 12 which contains a mixture of quaternary ammonium salts in which:
n and m are 0, 1 or 2, provided that n+m is not greater than 3;
$R_1$ and $R_3$ are methyl;
$R_2$ is a mixture of $C_{12}$, $C_{14}$ and $C_{16}$ alkyl moieties;
$R_4$ is benzyl; and
$R_5$, $R_6$, $R_7$ and $R_8$ are the same or different and are alkyl having about 8 carbons or hydrogen with the proviso that at least one of $R_5$, $R_6$, $R_7$ and $R_8$ is other than hydrogen.

27. A composition according to claim 12 wherein aid salts are selected from the group consisting of n-alkyl dimethyl benzyl ammonium salts of bis-(2-ethylhexyl) hydrogen pyrophosphate and octylphenyl hydrogen phosphate.

28. A composition according to claim 12 wherein said composition comprises not more than about 5 weight percent of said salts based on the total weight of the composition.

29. A composition according to claim 28 wherein the weight percent of said salt is from about 2 to about 0.0001.

30. A composition according to claim 29 wherein the weight percent of said salt is from about 1 to about 0.001.

31. A composition according to claim 30 wherein said weight percent is from about 0.1 to about 0.01.

32. A composition according to claim 12 wherein:
n and m are integers from 0 to about 5, provided that n+m is not greater than 5;
$R_1$ is methyl or ethyl;
$R_2$ is alkyl having from about 12 to about 16 carbon atoms;
$R_3$ is $R_1$;
$R_4$ is aryl, aralkyl or alkaryl;
$R_5$ is hydrogen;
$R_6$, $R_7$ and $R_8$ are the same and are alkyl having from about 8 to about 18 carbon atoms or alkaryl.

33. A composition according to claim 12 which contains a mixture of quaternary ammonium salts in which:
n and m are integers from 0 to about 1, provided that n+m is not greater than 2;
$R_1$ is methyl;
$R_2$ is $C_{12}$, $C_{14}$, or $C_{16}$ alkyl;
$R_3$ is $R_1$;
$R_4$ is benzyl or naphthyl;
$R_5$ is hydrogen;
$R_6$, $R_7$ and $R_8$ are the same and are alkyl having about 8 carbon atoms or alkaryl.

34. A composition according to claim 12 which contains a mixture of quaternary ammonium salts in which:
n and m are 0;
$R_1$ is methyl;
$R_2$ is $C_{12}$, $C_{14}$ or $C_{16}$ alkyl;
$R_3$ is $R_1$;
$R_4$ is benzyl;
$R_5$ and $R_7$ are the same or different and are hydrogen or octylphenyl.

35. A composition according to claim 12 which contains a mixture of quaternary ammonium salts in which:
n and m are 0, 1 or 2, provided that n+m is not greater than 3;
$R_1$ is methyl;
$R_2$ is $C_{12}$, $C_{14}$ or $C_{16}$ alkyl;
$R_3$ is $R_1$;
$R_4$ is benzyl;
$R_5$, $R_6$, $R_7$ and $R_8$ are the same or different and are alkyl having about 8 carbons atoms or hydrogen with the proviso that at least one of $R_5$, $R_6$, $R_7$ and $R_8$ is other than hydrogen.

36. A process of cleaning and/or drying non-absorbent articles comprising the steps of:
(a) immmersing the article in the composition of claim 11;
(b) removing the article from said composition; and
(c) drying said article by effecting evaporation of said composition from the surface of said article.

37. A process of cleaning and/or drying non-absorbent articles comprising the steps of:
(a) immersing the article in the composition of claim 11;
(b) removing the article from said composition;
(c) contacting the article with hot or cold solvent without surfactant present;
(d) removing the article from contact with said solvent of said composition from the water of said article; and
(e) drying said article by effecting evaporation.

* * * * *